United States Patent [19]  [11] 3,897,502
Russell et al.  [45] July 29, 1975

[54] PROCESS FOR MAKING FLUORINATED ETHERS
[75] Inventors: James P. Russell, Berkeley Heights; Alex J. Szur, North Plainfield; Ross C. Terrell, Plainfield, all of N.J.
[73] Assignee: Airco, Inc., Montvale, N.J.
[22] Filed: Aug. 23, 1973
[21] Appl. No.: 390,690

Related U.S. Application Data
[63] Continuation of Ser. No. 191,811, Oct. 22, 1971, abandoned.

[52] U.S. Cl......... 260/614 F; 260/615 F; 260/340.9
[51] Int. Cl............................................. C07c 41/00
[58] Field of Search....... 260/614 F, 615 F, 615 BF, 260/340.7, 340.9

[56] References Cited
UNITED STATES PATENTS
3,242,218 3/1966 Miller.............................. 260/614 F OTHER PUBLICATIONS
Haszeldine et al., Fluorine and its Compounds, Methuend Co., 1951, pp. 144.

Tedder, Advances in Fluorine Chemistry, Vol. 2, Butterworths, London, 1961, pp. 112–116.
Lovelace et al., Aliphatic Fluorine Compounds, Reinhold Publishing Corp., 1958, pp. 155–156, 20, 21, 22, 23.
Simon, Fluorine Chemistry, Academic Press, New York, Vol. 1, 1950, pp. 420.

Primary Examiner—Howard T. Mars
Attorney, Agent, or Firm—Roger M. Rathbun; Edmund W. Bopp; H. Hume Mathews

[57] ABSTRACT

A method is disclosed for partially fluorinating an alkane or a cycloalkane polyfluoroether feedstock in the liquid phase by contacting it with molecular fluorine at a temperature of about −40°C. to 0°C. Degradation, polymerization, excessive fluorination or combinations of these effects of prior art processes are avoided by the use of the present invention while relatively high yields can be obtained.

12 Claims, No Drawings

PROCESS FOR MAKING FLUORINATED ETHERS

This is a continuation of application Ser. No. 191,811 filed Oct. 22, 1971, and now abandoned.

This invention is concerned with the fluorination of polyfluoro-containing ethers to obtain further, but still partially, fluorinated ethers. More particularly, this invention relates to the fluorination of polyfluoro-containing ethers by using molecular fluorine, and thereby obtaining a relatively selective yield of the corresponding ethers which contain at least one additional fluorine atom per molecule but are not perhalogenated materials.

The polyfluoro-containing ethers made in accordance with the method of this invention are misible with other organic liquids including fats and oils, and have useful solvent properties, for example, as solvents for fluorinated olefins and other fluorinated materials such as fluorowaxes. The polyfluoro ether products can be used to prepare pastes and dispersions of such fluorine-containing olefins and waxes to provide coatings, and the polyfluoro ether products can be used as degreasing agents. Some of the polyfluoro-containing products which can be made by the method of this invention are also useful as agents for producing anesthesia in anesthetic-susceptible, airbreathing mammals, and generally anesthetic activity has not been found to be exhibited by ethers which are perhalogenated. It is therefore desirable to produce partially halogenated polyfluoro ethers.

By the present invention it has been found that polyfluorinated ethers can be made by reaction of molecular fluorine with a corresponding ether having a plurality of fluorine atoms per molecule, and may not contain other halogen atoms such as one or more chlorine or bromine atoms. The chlorine-containing feeds often have one or two chlorine atoms per molecule. These fluorination reactions are relatively selective towards the production of ethers having the same carbon skeletal structure as the material fluorinated, and the products contain one or more, especially one or two, additional fluorine atoms per molecule due to replacement of hydrogen or bromine in the feed molecule. In the fluorination process of this invention, reactions such as cracking, telomerization, dimerization and polymerization are minimized. The feedstocks which are fluorinated according to this invention have at least as many halogen atoms as carbon atoms, such halogen having an atomic number from 9 to 35, i.e. fluorine, chlorine, and bromine. Also the polyfluoro ethers which are reacted contain at least two hydrogen atoms per molecule, and preferably at least two carbon atoms bear one or more hydrogen atoms. The desired products of these fluorination reactions contain at least one hydrogen atom per molecule, and thus are not perhalogenated materials.

The reactions of this invention are conducted at reduced temperatures which are generally in the range of about $-40°$ to $0°C.$, preferably about $-10°$ to $-30°C.$ The fluorinations are preferably conducted in the presence of a liquid solvent which is essentially inert under the reaction conditions and which is a solvent for the ether feed and the desired fluorinated product. The molecular fluorine employed in the reactions is in admixture with another gas which is also essentially inert in this system. The fluorination reaction is thus accomplished by the use of an intimate mixture of the ether feedstock, molecular fluorine, inert gas and, preferably, liquid solvent. The reaction pressure can be varied as desired but is conveniently about atmospheric pressure or below, since reacting fluorine under elevated pressures is dangerous and should not be done without extreme care. The contact time between the ether feedstock and the molecular fluorine can also vary and from an economical standpoint is usually sufficient to permit the major portion, if not essentially all, of the fluorine charged to the system to be reacted. The fluorination reaction can, if desired, be catalyzed by photo energy such as incandescent or ultraviolet light.

The use of molecular fluorine as a fluorinating agent for various organic feedstocks has been the subject of considerable study. Molecular fluorine can react rather violently with many organic compounds and thereby produce large amounts of undesirable degradation products. Efforts to moderate these reactions by diluting one or more of the reactants with inert components, the use of low reaction temperatures, or the employment of reaction zones containing large amounts of solid surface areas have given various results depending on the reactants and conditions employed. The reactions are often still accompanied by unwanted manifestations such as the production of materials resulting from, for instance, degradation, polymerization, excessive fluorination or combinations of these effects. Thus the reactions are frequently not selective in nature, i.e. they generally do not provide one or even a few given products in relatively high yields, or many products having the same carbon or skeletal structure as the feedstock which is fluorinated. These prior practices have been especially unrewarding in providing partially halogenated materials containing a plurality of fluorine atoms in the molecule. In fact it has been observed that in some cases as the amount of fluorine in the material to be fluorinated increases the difficulty of further fluorination increases, and it has been particularly difficult to obtain further fluorination at a carbon atom which already bears a fluorine atom or at a carbon atom adjacent thereto. There are exceptions to this observation, for instance, see U.S. Pat. No. 3,455,954 which describes the fluorination of certain fluorine-containing cyclic carbonates, but perfluorinated products are produced.

A review concerning the fluorination of organic materials by the use of molecular fluorine appears in "Advances in Fluorine Chemistry", Volume 2, beginning at page 104, J. M. Tedder. This article points to the problems, including those described above, which are encountered when one endeavors to conduct the fluorination, and also notes the different results that are obtained when feedstocks of varying structure are employed. The present invention avoids these problems in large measure.

Ethers which can be fluorinated according to the present invention are the saturated alkane or cycloalkane ethers which contain at least two fluorine atoms per molecule and may be further substituted with chlorine or bromine, especially only chlorine. As previously noted the total of these halogens on the ether feed provides as many halogen atoms as carbon atoms in the molecule of ether feedstock, and often this ratio can be 2:1 but no higher. The feed ethers contain at least two hydrogen atoms per molecule and preferably at least two carbon atoms bear one or more hydrogen atoms. The ethers which are fluorinated according to this invention contain at least 2 carbon atoms, and generally up to about 8 or 16 or more carbon atoms. Often the ether feed has 2 to 5 carbon atoms. The ether feeds may have 1 or 2 ether oxygen atoms and the total amount of fluorine, chlorine and bromine in the molecule often constitutes about 50 to 75 weight percent of the material. A group of preferred ethers which is employed contains a difluoromethyl group and further fluorination of these feedstocks occurs in a dissimilar group of the ether. Also among the suitable ether feedstocks are those having the structure

in which R is lower alkyl, e.g. of 1 to 4 carbon atoms, especially methyl, and $n$ is 0 to 4.

The fluorination reaction of this invention is conducted with both the ether feedstock and solvent being essentially in the liquid phase at the reaction conditions. The solvent can be any suitable, essentially inert liquid, and may be an alkane substituted with one or both of fluorine or chlorine. Also among the useful solvents are ethers which are substituted with one or both of chlorine of fluorine. Both the substituted alkane and alkyl ether solvents contain sufficient halogen so that fluorination or other reactions of the solvents is essentially avoided and the solvents may often be perhalogenated materials or contain only a single hydrogen atom per molecule. The solvents include, for example, carbon tetrachloride, trifluorotrichloroethane, products of the fluorination of this invention such as trichlorodifluorodimethyl ether, ethers of the formula

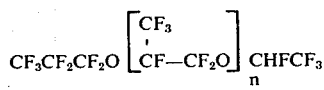

wherein $n$ is 0 to 2, and the like. The solvent can be selected so that its boiling point is sufficiently away from that of the product to facilitate separation by distillation. Also, the solvent can be selected to reduce the chances of forming azeotropes which can make such separation more difficult. Especially if the volume of feed ether to the amount of fluorine supplied to the reaction zone is sufficient, satisfactory reactions may be obtained in the absence of the solvent. The amount of solvent employed in the fluorination system can vary considerably, and it serves to moderate the reaction and as a heat transfer medium. Thus the solvent can make control of the reaction easier when substantial fluorine feed rates are employed. The amount of solvent may often be about 2 to 20, often about 5 to 10, times the volume of the ether reactant.

As previously noted, the molecular fluorine employed in the method of this invention is diluted with an inert gas. The amount of diluent gas used is sufficient to moderate the reaction so that it is controllable. Often such amounts are about 5 to 75 volume %, preferably to about 15 to 40 volume %, of molecular fluorine based on the fluorine and inert gas charged to the fluorination reaction zone. Among the useful gases are argon, nitrogen, tetrafluoromethane and other gases inert to fluorine. The rate at which molecular fluorine can be supplied to the reaction of this invention may vary according to factors such as the character of the ether being fluorinated, the reaction temperature, the efficiency of heat exchange and the extent of fluorination, fluorine utilization and speed of reaction desired.

The present invention will be further illustrated by the following specific examples. In the examples the conversions and yields are reported on a molar basis unless indicated otherwise. Also the conversion and yields are defined as followed $$\% \text{ Conversion} = \frac{\text{Moles of Product}}{\text{Moles of Feed}} \times 100$$

$$\% \text{ Yield} = \frac{\text{Moles of Product}}{\text{Moles of Starting Ether Not Recovered}} \times 100$$

In all the examples the fluorinations were conducted in a reactor immersed in a cooling bath.

EXAMPLE I $CF_3(CF_2Cl)CHOCH_3$ (94% pure) in an amount of 0.5 mole (99 g.) was added to approximately 450 milliliters of Freon 113 ($CF_2ClCFCl_2$) and placed into a 500 milliliter, agitated reaction vessel. The temperature of the mixture was lowered to about $-20°C$. The mixture was fluorinated with 20% fluorine in argon at a fluorine flow rate of 0.2 mole of fluorine per hour for 5 hours. During the reaction the temperature of the mixture was maintained at $-18°$ to $-19°C$. with an $11°-17°C$. exotherm being observed. The products of the reaction were recovered by distillation. Analysis of the distillation fractions indicated that the reaction yielded 0.02 mole of $CF_3(CF_2Cl)CFOCH_2F$ and 0.25 mole of $CF_3(CF_2Cl)CHOCHF_2$ and a recovery of 0.04 M $CF_3(CF_2Cl)CHOCH_3$ for a conversion of 54% and a yield of 62%.

EXAMPLE II $CHF_2OCH_2Cl$ in an amount of 0.71 mole has added to 925 milliliters of Freon 113 and placed into a one liter, agitated reaction vessel. The temperature of the mixture was lowered to $-20°C$. The mixture fluorinated with 20% fluorine in argon at a rate of 0.2 mole of fluorine per hour for 10½ hours. During the reaction the temperature of the mixture was maintained at $-20°C$. with a $3°-9°C$. exotherm being observed. The products of the reaction were recovered by distillation. Analysis of the distillation fractions indicated that the reaction yielded 0.085 mole of $CHF_2OCF_2Cl$ and 0.23 mole of $CHF_2OCHFCl$ for a conversion of 44.2%. No unreacted $CHF_2OCH_2Cl$ was recovered, hence the yield was 44.2%.

EXAMPLE III $CHF_2OCHCl_2$ (68% pure) in an amount of 1 mole (156 g.) was added to 950 milliliters of Freon 113 and placed into a one liter, agitated reaction vessel. The fluorination conditions were identical to those in Example II with the exception that a reaction time of 7 hours was used. The reaction product was distilled and analyzed to be 0.36 mole of $CHF_2OCFCl_2$ for a 36% conversion. 0.62 Mole of unreacted $CHF_2OCHCl_2$ was found after fluorination, hence a 98% yield occurred.

EXAMPLE IV

The following example illustrates the use of different solvents, temperatures and fluorine concentrations in fluorination by the method of the present invention. $CHF_2OCHCl_2$ (85% pure) in an amount of 0.5 mole was added to 400 milliliters of $CCl_4$ and placed into a 500 milliliter, agitated reaction vessel. The temperature of the mixture was lowered to −10°C. and was maintained at that temperature during fluorination. Fluorination was conducted using 30% fluorine in argon at a rate of 0.1 mole of fluorine per hour for 5 hours. Analysis of the reaction mixture was made after separation of the product by distillation and indicated a recovery of 0.235 mole of $CHF_2OCFCl_2$ and 0.16 mole of $CHF_2OCHCl_2$ for a conversion of 47% and yield at 69%.

EXAMPLE V

This example demonstrates the unsuitability of feedstocks containing two and one-half times as many halogens as carbons in the method of the present invention.

$CHF_2OCCl_3$ in an amount of 0.6 mole was added to 860 milliliters of $CCl_4$ and placed into a one-liter, agitated reaction vessel. The temperature of the mixture was lowered to −15°C. and there maintained during the fluorination reaction. The mixture was subjected to 20% fluorine in argon at a flow rate of 0.2 mole of fluorine per hour for three hours. Analysis of the mixture was then made by vapor phase chromatography and indicated that no fluorination products were produced.

EXAMPLE VI $(CF_3)_2CHOCH_3$ in an amount of 0.95 mole was added to 950 milliliters of Freon E-3, having the formula

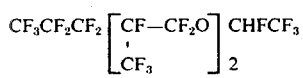

and placed into a one-liter, agitated reaction vessel. The temperature of the mixture was lowered to and maintained at −20°C. during fluorination. The mixture was fluorinated with 20% fluorine in argon at a flow rate of 0.2 mole fluorine per hour for 6⅓ hours. An exotherm of 10°C. was noted during the reaction. The mixture was then distilled and was analyzed to contain 0.03 mole of $(CF_3)_2CHOCH_3$, 0.32 mole of $(CF_3)_2CHOCH_2F$ (33.7% conversion) and 0.28 mole $(CF_3)_2CHOCHF_2$ (29.5% conversion) for a total conversion of 63.2% and a yield of 66.3%.

EXAMPLE VII

The following example illustrates the use of a −30°C. reaction temperature in the process of the present invention. $(CF_3)_2CFOCH_3$ in an amount of 0.7 mole was added to approximately 950 milliliters of Freon 113 and placed in a one-liter, agitated reaction vessel. The temperature of the mixture was adjusted to −30°C. and there maintained during fluorination. Fluorination was carried out by passing through the mixture a flow of 20% fluorine in argon at a rate of 0.1 mole of fluorine per hour for 14 hours. The mixture was distilled and then analyzed to contain 0.31 mole of $(CF_3)_2CFOCH_2F$ (44% conversion) and 0.22 mole of $(CF_3)_2CFOCHF_2$ (31% conversion) for a total conversion of 75%. Essentially none of the starting material was found, hence the yield was 75%.

EXAMPLE VIII $CF_3(CF_2Cl)CFOCH_3$ (90% pure) in an amount of 0.5 mole was added to approximately 450 milliliters of Freon 113 and placed in a 500 milliliter, agitated reaction vessel. The reaction vessel was surrounded by a cooling bath at a temperature of −25° to −29°C. A gas consisting of 20% fluorine in argon was passed through the mixture at a rate of 0.1 mole of fluorine per hour for 6 hours to effect fluorination. The cooling bath maintained the temperature of the mixture at −20C. An exotherm of 5°–9°C. was noted. The fluorinated product was recovered by distillation and then analyzed to be 0.22 mole of $CF_3(CF_2Cl)CFOCH_2F$ for a conversion of 44%. 0.015 Mole of unreacted $CF_3(CF_2Cl)CFOCH_3$ was also found in the mixture, and hence the yield was 47%.

EXAMPLE IX $(CF_2Cl)_2CFOCH_3$ in an amount of 0.9 mole was added to approximately 900 milliliters of Freon 113 and placed in a one liter, agitated reaction vessel. The mixture was fluorinated with 20% fluorine in argon at a flow rate of 0.2 mole of fluorine per hour for 7 hours. The temperature of the reaction mixture was maintained at −20°C. during the reaction by the use of a −28°C. cooling bath surrounding the reaction vessel. The reaction mixture was distilled. Analysis of the distillation fractions showed that 0.06 mole of $(CF_2Cl)_2CFOCH_3$ remained unreacted and that 0.06 mole of $(CF_2Cl)_2CFOCH_2F$ and 0.19 mole of $(CF_2Cl)_2CFOCHF_2$ were produced for a total conversion of 88% and yield of 94%.

EXAMPLE X $CHF_2OCHClCF_2CHF_2$ in an amount of 0.34 mole was added to approximately 450 milliliters of Freon 113 and placed into a 500 milliliter, agitated reaction vessel. The temperature of the mixture was adjusted to −13°C. and there maintained during fluorination. Fluorination was conducted with a flow of 20% fluorine in argon at a rate of 0.1 mole fluorine per hour for 4.5 hours. The reaction mixture was distilled and analyzed to contain 0.175 mole of unreacted $CHF_2OCHClCF_2CHF_2$ and 0.084 mole of $CHF_2OCFClCF_2CHF_2$ for a conversion of 24.7% and a yield of 76.1%.

The following two examples demonstrate the use of Freon E-3 and $CCl_4$ as solvents:

EXAMPLE XI $CH_3OCF_2CHFCl$ in an amount of 1.0 mole was added to 900 milliliters of Freon E-3 and placed in a one-liter, agitated reaction vessel. Fluorination was conducted by passing through the mixture 20% fluorine in argon at a rate of 0.2 mole of fluorine per hour for 13 hours. During fluorination the reaction mixture was maintained at a temperature of −20° to −25°C. The mixture was distilled. Analysis of the distillate indicated the presence of 0.055 mole of unreacted $CH_3OCF_2CHFCl$, 0.077 mole of $CHF_2OCF_2CF_2Cl$ (7% conversion), 0.102 mole of $CH_2FOCF_2CF_2Cl$ (10% conversion), 0.2555 mole of $CHF_2OCF_2CHFCl$ (25.5% conversion), and 0.496 mole of $CH_2FOCF_2CHFCl$ (49.6% conversion) for a total conversion of 92% and yield of 97%.

EXAMPLE XII

Example XI was repeated except using 900 milliliters of $CCl_4$ instead of Freon E-3 as a solvent. The fluorination of this reaction mixture was found to produce a 38% conversion to $CH_2FOCF_2CHFCl$, a 23% conversion of $CHF_2OCF_2CHFCl$, and a 24% conversion to $CH_2FOCF_2CF_2Cl$ for a total conversion of 85%. No unreacted $CH_3OCF_2CHFCl$ was found, hence the yield was 85%.

EXAMPLE XIII

This example is a demonstration of the unsuitability in this invention of feedstocks having fewer halogen atoms than carbon atoms.

2,2-Bis(difluoromethyl)dioxolane (disfluoromethyl)-dioxolane in an amount of 0.14 mole was added to approximately 450 milliliters of $CCl_4$ and placed in a 500 milliliter, agitated reaction vessel. The temperature of the reaction mixture was adjusted to $-15°C$. and maintained thereat during fluorination. Fluorination was conducted by passing through the mixture 20% fluorine in argon at a rate of 0.1 mole of fluorine per hour for 3 hours. During fluorination the reaction mixture was subjected to vigorous stirring. After fluorination the mixture was poured into cold water and neutralized with potassium carbonate. The heavy organic layer which had formed was separated and dried over anhydrous sodium sulfate. The $CCl_4$ was removed by fractional distillation up to a still pot temperature of 106°C. Eleven grams of material were found to remain in the still pot after distillation and were analyzed to be 55% $CCl_4$ and four unknown components of 14.5%, 8.0%, 6.5% and 14.0%. Based upon the small quantity of the obtained fluorination product, it appears that substantial degradation of the ether occurred during fluorination.

EXAMPLE XIV

This example uses an ether having as many halogens as carbon atoms. 2-Difluoromethyl-2-trifluoromethyl-1,3-dioxolane in an amount of 0.28 mole was added to 425 milliliters of Freon 113 and placed into a 500 milliliter, agitated reaction vessel. The mixture was cooled to a temperature of $-20°C$. and maintained thereat for the duration of fluorination. Fluorination was achieved by using 20% fluorine in argon at a rate of 0.1 moles of fluorine per hour for 15 hours. An 8°C. exotherm was observed during the reaction. The reacted mixture was distilled and analyzed to contain 9.5 g. of 2-difluoromethyl -2-Trifluoromethyl - 4-fluoro - 1,3-dioxolane and 23 g. of 2-difluoromethyl - 2-trifluoromethyl -4,4,5-trifluoro-1,3-dioxolane for a total conversion of 54% and a yield of 54%.

EXAMPLE XV 2,2-Bis (trifluoromethyl)-1,3-dioxolane in an amount of 0.5 mole was added to approximately 900 milliliters of Freon 113 and placed into a one-liter, agitated resin kettle. The temperature of the mixture was adjusted to $-19°C$. and maintained thereat for the duration of the fluorination. Fluorination was achieved using 20% fluorine in argon at a rate of 0.1 mole of fluorine per hour for 5 hours. Vigorous stirring was used during the period of fluorination. The reaction material was then analyzed and was found to contain 0.12 mole of unreacted 2,2-bis (trifluoromethyl)dioxobane 0.225 mole of 1-fluoro-2,2-bis(trifluoromethyl)dioxolane (45% conversion) and 0.08 mole of 1,3-difluoro-2,2-bis(trifluoromethyl)dioxolane (16% conversion) for a total conversion of 61% and a yield of 85%.

EXAMPLE XVI $CF_3CHClOCHF_2$ in an amount of 0.5 mole was added to 350 milliliters of $CCl_4$ and placed into a 500 milliliter, agitated reaction vessel. The temperature of the mixture was adjusted to $-10°C$. and maintained thereat for the period of fluorination. Fluorination occurred by using 33⅓ fluorine in argon at a flow rate of 0.1 mole of fluorine per hour for 7 hours. Analysis of the reaction mixture indicated that 0.16 mole of $CF_3CFClOCHF_2$ was produced for a 32% conversion and 0.27 mole of the starting ether reactant was recovered, hence a yield of 60% was obtained.

EXAMPLE XVII $CF_3CH_2OCF_2CHFCl$ in an amount of 1.0 mole was added to 900 milliliters of $CCl_4$ and placed in a oneliter, agitated flask. The temperature of the mixture was adjusted to $-15°C$. and maintained thereat for the duration of the fluorination-reaction. Fluorination was achieved by using 33⅓ fluorine in argon at a flow rate of 0.2 mole fluorine per hour for seven hours. The reacted mixture was analyzed to contain 0.05 mole of $CF_3CHFOCF_2CF_2Cl$ (5% conversion), 0.16 mole of $CF_3CHFOCF_2CHFCl$ (16% conversion) and 0.15 mole of $CF_3CH_2OCF_2CF_2Cl$ (15% conversion) for a total conversion of 36%. 0.56 Mole of unreacted $CF_3CH_2OCF_2CHFCl$ was found; hence a yield of 64% was obtained.

EXAMPLE XVIII $CF_3CH_2OCF_2CHCl\ 2$ in an amount of 1.0 mole was added to 850 milliliters of Freon 113 and placed in a oneliter, agitated reaction vessel. The temperature was adjusted to $-20°C$. and maintained thereat for the duration of the fluorination reaction. Fluorination was conducted using 33⅓% fluorine in argon at a flow rate of 0.2 mole per hour for seven hours. Analysis of the reacted mixture indicates its contents to contain 0.12 mole of $CF_3CHFOCF_2CHCl_2$ (12% conversion), 0.30 mole of $CF_3CH_2OCF_2CFCl_2$ (30% conversion), and 0.05 mole of $CF_3CHFOCF_2CFCl$ (5% conversion) for a total conversion of 47%. 0.54 Mole of unreacted $CF_3CH_2OCF_2CHCl_2$ was found, hence a yield of 88% was obtained.

EXAMPLE XIV $CF_3CH_2OCF_2CF_2H$ in an amount of 0.5 mole was added to 350 milliliters of $CCl_4$ and placed in a 500 milliliter, agitated reaction vessel. The temperature of the mixture was adjusted to $-20°C$. and maintained thereat for the duration of the fluorination reaction. Fluorination was conducted using 33⅓ percent fluorine in argon at a flow rate of 0.2 mole of fluorine per hour for seven hours. Analysis found the reaction mixture to contain 0.14 mole of $CF_3CHFOCF_2CHF_2$ (28% conversion), and 0.27 mole of unreacted $CF_3CH_2OCF_2CHF_2$ and a yield of 60%.

EXAMPLES XX to XXV

Example XI was repeated but using an equivalent mole amount of another partially halogenated ether instead of $CH_3OCF_2CHFCl$. Table 1 summarizes the results of these examples.

TABLE I

| Example | Compound Fluorinated | Product | Conversion | Yield |
|---|---|---|---|---|
| XX | $CH_3OCF_2CHFBr$ | $CH_3OCF_2CHF_2$ | 50% | 50% |
| XXI | $CF_3CH_2OCHF_2$ | $CF_3CHFOCHF_2$ | 30% | 60% |
| XXII | $CH_3OCF_2CF_2H$ | $CH_2FOCF_2CHF_2$ | 30% | 90% |

TABLE I-Continued

| Example | Compound Fluorinated | Product | Conversion | Yield |
|---|---|---|---|---|
| XXIII | $CF_3CH_2OCH_2CF_3$ | $CF_3CHFOCH_2CF_3$ | 30% | 75% |
| XXIV | $CHF_2OCF_2CHFCl$ | $CHF_2OCF_2CF_2Cl$ | 36% | 80% |
| XXV | $CH_2FOCF_2CFCl_2$ | $CHF_2OCF_2CFCl_2$ | 65% | 80% |

Some of the ether products made by the process of this invention are useful as anesthetics for air-breathing mammals. In order to determine the potency of these fluorinated ethers as inhalation anesthetics in combination with oxygen, tests were carried out on mice. The products used were at least 99.5% pure as determined by vapor phase chromatography.

In the tests, a given fluorinated ether is administered to test mice by a standard procedure in which a measured quantity of the agent is placed in a laboratory jar and allowed to completely vaporize so as to give a calculated vapor concentration. The test mice are then quickly placed in the jar and observed. Anesthesia is determined by observing the righting reflex of the mice. Recovery time is measured beginning when the mice are transferred from the test jar to room air and ending when the mice are observed to be able to walk. The products of Examples XIII, XIV, XVI and XXII and the 1,2,2,2-tetrafluoroethyl -1', 1', 2'-trifluoro-2'-chloroethyl ether product of Example XVII were found to have anesthetic activity in these tests.

The anesthetic agents may be administered by any of the well known techniques used for the administration of general inhalation agents, such as the open drop, semiclosed, and closed systems. The compounds made by the process of this invention which have anesthetic activity can be effectively used as an inhalant anesthetic in respirable mixtures containing life-supporting concentrations of oxygen as well as mixtures containing oxygen and other inhalation anesthetics such as nitrous oxide. The effective amount of the compound to be employed depends on the level of anesthesia to which the mammal is to be brought, the rate at which anesthesia is to be induced, and the length of time over which anesthesia is to be maintained. Minor volume percentage of the compound in oxygen from several percent can be employed. The amount of anesthesia to be used can be regulated, starting with a small amount of the ether and gradually increasing the amount until the desired plane of anesthesia is reached. By the monitoring the physical reactions of the mammals, as is the usual procedure, the duration and plane of anesthesia can be readily controlled.

While there have been described what are at present considered to be preferred embodiments of the invention, it will be understood that various modifications may be made therein which are within the true spirit and scope of the invention.

It is claimed:

1. A method for partially fluorinating a polyfluoroether feedstock selected from the group consisting of dimethyl dioxalane and a standard alkane containing from 2 to about 16 carbon atoms, said polyfluoroether feedstock having at least two fluorine atoms, at least two hydrogen atoms and one or two ether oxygen atoms per molecule and having as many halogen atoms of atomic number 9 to 35 as carbon atoms in the molecule, the ratio of halogen atoms to carbon atoms in the molecule of the polyfluoroether feedstock being no more than 2:1, said method being selective toward the production of a further fluorinated polyfluoroether having at least one hydrogen atom and the same carbon skeletal structure in its molecule as said polyfluoroether feedstock, comprising contacting said polyfluoroether feedstock with a mixture of molecular fluorine and inert gas in a reaction zone under reaction conditions at which the polyfluoroether feedstock is in the liquid phase, the amount of inert gas in said mixture being sufficient to moderate the reaction so that it is controllable and the mixture contains about 5 to 75 volume percent molecular fluorine based on the total fluorine and inert gas charged to the reaction zone, the reaction temperature being in the range of about $-40°$ to $0°$ C., to prepare a further fluorinated polyfluoroether product having at least one hydrogen atom and the same carbon skeleton in its molecule as said polyfluoroether feedstock.

2. The method defined in claim 1 wherein the polyfluoroether feedstock has 2 to 5 carbon atoms in the molecule and the total amount of halogen atoms of atomic number 9 to 35 in the molecule of the polyfluoroether feedstock constitutes about 50 to 75 weight percent of such ether feedstock.

3. The method defined in claim 1 wherein the polyfluoroether feedstock is a difluoromethyl ether of the saturated alkane polyfluoroether feedstock.

4. The method defined in claim 1 wherein the polyfluoroether feedstock has the structure $CHF_2CF_2(CF_2CF_2)_nCH_2OR$, in which R is lower alkyl and $n$ is 0 to 4.

5. A method for partially fluorinating a polyfluoroether feedstock selected from the group consisting of dimethyl dioxalane and a saturated alkane containing from 2 to about 16 carbon atoms, said polyfluoroether feedstock having at least two fluorine atoms, at least two hydrogen atoms and one or two ether oxygen atoms per molecule and having as many halogen atoms of atomic number 9 to 35 as carbon atoms in the molecule, the ratio of halogen atoms to carbon atoms in the molecule of the polyfluoroether feedstock being no more than 2:1, said method being selective toward the production of a further fluorinated polyfluoroether having at least one hydrogen atom and the same carbon skeletal structure in its molecule as said polyfluoroether feedstock, comprising contacting said polyfluoroether feedstock with a mixture of molecular fluorine and inert gas in a reaction zone under reaction conditions at which the polyfluoroether feedstock is in the liquid phase, the amount of inert gas in said mixture being sufficient to moderate the reaction so that it is controllable and the mixture contains about 5 to 75 volume percent molecular fluorine based on the total fluorine and inert gas charged to the reaction zone, the reaction temperature being in the range of about $-40°$ to $0°$C., to prepare a further fluorinated polyfluoroether product having at least one hydrogen atom and the same carbon skeleton in its molecule as said polyfluoroether feedstock, said reaction being conducted in the presence of a solvent for said polyfluoroether feedstock and said further fluorinated polyfluoroether product, which solvent is liquid and essentially inert under said reaction conditions.

6. The method defined in claim 5 wherein said solvent is an alkane or alkyl ether which is perhalogenated or contains only one hydrogen atom in its molecule and is substituted only with one or both of fluorine or chlorine.

7. The method defined in claim 6 wherein the polyfluoroether feedstock has 2 to 5 carbon atoms in the molecule.

8. The method defined in claim 7 wherein the total amount of halogen atoms of atomic number 9 to 35 in the molecule of the polyfluoroether feedstock constitutes about 50 to 75 weight percent of the polyfluoroether feedstock molecule and wherein at least two carbon atoms in the molecule of the polyfluoroether feedstock bear at least one hydrogen atom.

9. The method defined in claim 6 wherein the polyfluoroether feedstock has the structure $CHF_2CF_2(CF_2CF_2)_nCH_2OR$, in which R is lower alkyl and $n$ is 0 to 4.

10. The method defined in claim 5 wherein said solvent has the structure

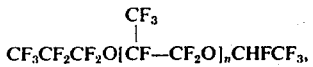

in which $n$ is 0 to 2.

11. The method defined in claim 10 wherein the polyfluoroether feedstock has 2 to 5 carbon atoms in the molecule.

12. The method defined in claim 10 wherein said polyfluoroether feedstock has the structure $CHF_2CF_2(CF_2CF_2)_nCH_2OR$, in which R is lower alkyl and $n$ is 0 to 4.

* * * * *

UNITED STATES PATENT AND TRADEMARK OFFICE
CERTIFICATE OF CORRECTION

PATENT NO. : 3,897,502
DATED : July 29, 1975
INVENTOR(S) : J.P. RUSSELL, A.J. SZUR & R.C. TERRELL It is certified that error appears in the above-identified patent and that said Letters Patent are hereby corrected as shown below:

Col. 1, line 34, insert after "may" the words -- or may --;

Col. 4, line 35, "has" should read -- was --;

Col. 6, line 24, "0.06" should read -- 0.60 --;

line 67, "of" should read -- to --;

Col. 7, line 8, "(disfluoromethyl)" should be deleted;

line 9, "dioxolane" should be deleted;

Col. 8, line 4, -- % -- should be inserted after "33-1/2";

line 17, -- % -- should be inserted after "33-1/3";

Col. 9, line 44, "age" should read -- ages --;

line 60, "standard" should read -- saturated --.

Signed and Sealed this twenty-third Day of December 1975

[SEAL]

Attest:

RUTH C. MASON
*Attesting Officer*

C. MARSHALL DANN
*Commissioner of Patents and Trademarks*